Sept. 30, 1941.　　　　　H. CHIREIX　　　　　2,257,594

DIRECT READING RADIO GONIOMETERS

Filed June 28, 1939

Inventor
Henri Chireix
By
Attorney

Patented Sept. 30, 1941

2,257,594

UNITED STATES PATENT OFFICE 2,257,594

DIRECT READING RADIO GONIOMETER

Henri Chireix, Paris, France, assignor to Compagnie Generale de Telegraphie Sans Fil, a corporation of France Application June 28, 1939, Serial No. 281,707
In France July 6, 1938

9 Claims. (Cl. 250—11)

Radio goniometers for direct reading are known in which the bearing of a transmitter relative to an axis is obtained definitively by the reading of the phase displacement between two alternating potentials obtained from a local oscillator whereby one of these potentials is derived directly from the generator and the other one is derived from the receiver output.

For providing such an arrangement, reference may be had, for instance, to French Patent No. 811,374 of December 30, 1935, entitled "Improvements in goniometers for direct reading." The measurement of this phase displacement requires a phase meter involving, however, great difficulties.

The present invention has for an object overcoming these drawbacks by transforming the variations of the phase into variations of the frequency and, more especially, into variations of the frequency of the local generator such that there corresponds to each bearing a particular frequency. This method has, furthermore, the advantage that the frequency may thus be transmitted at distance to a center of bearing, for instance, and that, on a same line having only two wires, the bearings of several goniometers could be transmitted at distance provided that for each of them different frequency intervals are employed. The bearing indicator may then be any type of frequency meter, more especially a frequency meter with vibrating reeds.

Figure 1:
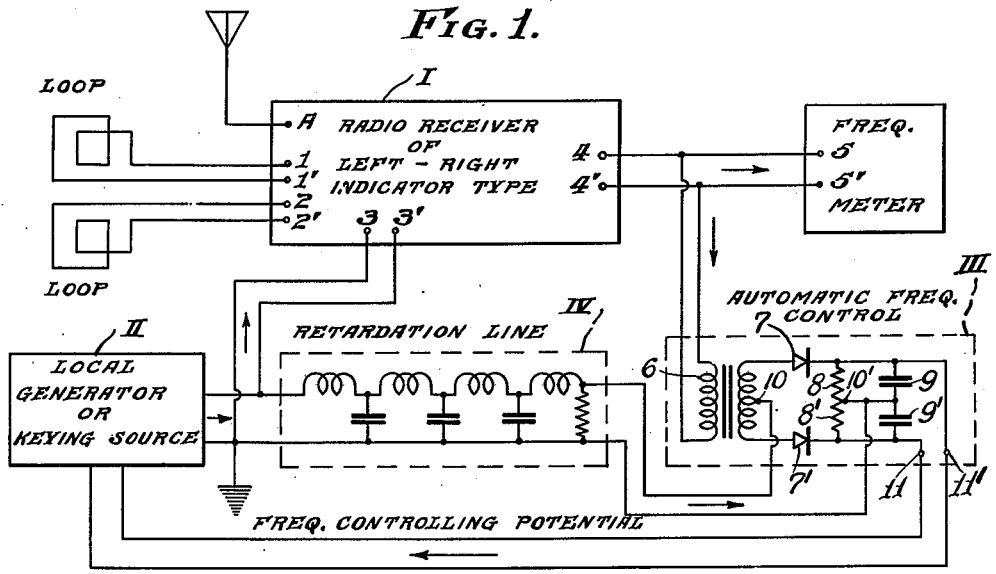
Figure 2:
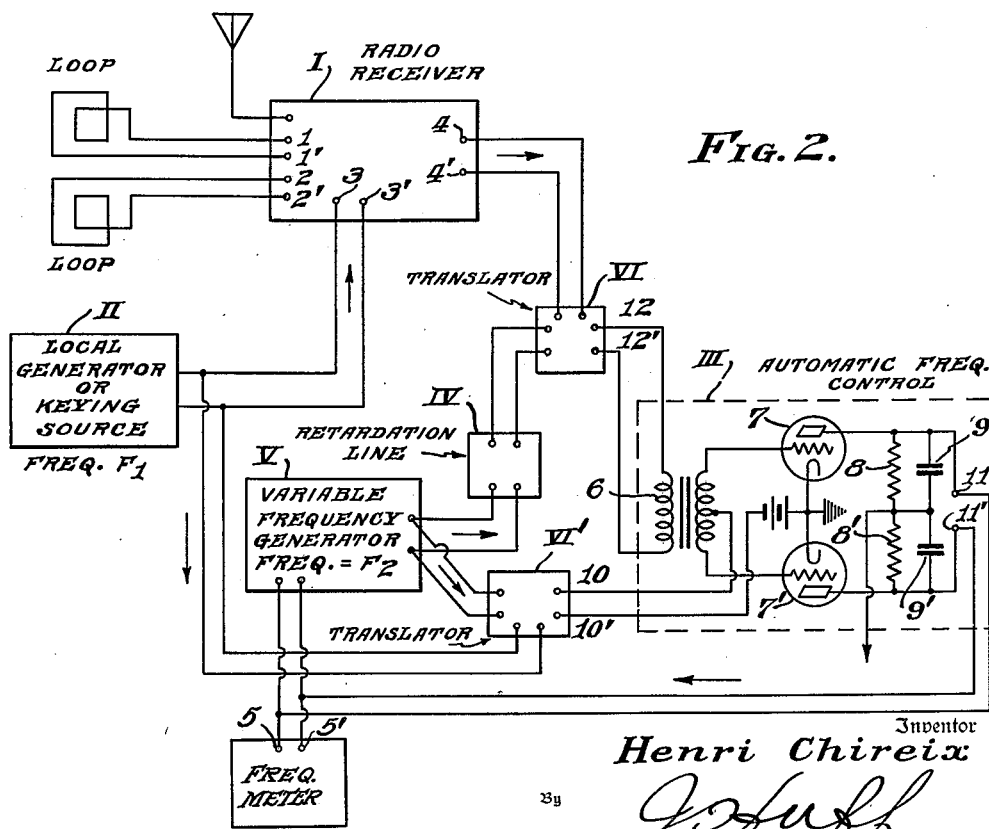

The invention will be better understood in reference to the accompanying figures given by way of example and without limiting the invention thereto. Fig. 1 is a schematic circuit diagram of one embodiment of the invention, and Fig. 2 is a schematic diagram of a modification thereof. Similar reference numerals have been used to indicate similar elements in the two figures.

In Figure 1, item I represents a receiver known as such whose input has connected in 1—1' and 2—2', two crossed loops or any equivalent system (Adcock system, for instance) and in A the antenna or any equivalent system serving for eliminating the ambiguity of the indication. This receiver furthermore comprises two branch terminals 3—3' connected to the local generator II and serving for switching electrically the loops for instance by means of a valve system, not shown herein. For the details of construction of such a receiver, it is referred, for instance, to French Patent No. 811,374 cited above.

At the output terminals 4—4' there is obtained as is known an alternating current having the frequency of the generator II and which is due to the action of a radiation to be found by the goniometer, but this current has a phase displacement relative to the generator, the angle of which is equal to that which the station to be determined by the goniometer forms with a reference axis. This current can be transmitted at distance to a place for its use designated by 5—5'.

The essential part of the invention resides in the combined use of the elements III and IV. The element III utilizes as such a well known circuit which is employed especially to obtain the automatic tuning of the receivers to a carrier wave. By way of example, such circuit is described in U. S. Patent No. 2,128,642, which issued August 30, 1938, on an application filed June 27, 1936, for "Automatic frequency control circuit." The element IV is a retarding line which provides a variable phase shift to the frequency.

The functioning of the element III will, however, be recalled: Reference numeral 6 designates a transformer with center tapping, reference numerals 7 and 7' indicate two identical detectors (dry contact rectifiers, for instance), reference numerals 8 and 8' represent two equal resistors shunted by equal capacitances 9 and 9' and it can be seen that if the potential applied at terminals 10—10' is exactly in phase quadrature with the potential created at the secondary terminals of 6, the two detectors 7—7' are equally charged. The difference potential between 11 and 11' is thus zero. In the case where the quadrature is not realized, a control potential appears between 11 and 11' whose direction depends upon the sense of the derangement of the quadrature. This control potential serves for controlling the frequency of the local generator II (tube generator).

The functioning of the arrangement will thus be readily understood:

If the station to be determined by means of the goniometer is in a direction such that the two potentials applied to the automatic frequency control circuit III are in quadrature, no control potential appears at terminals 11—11' and the local generator II supplies a frequency intermediate the extreme keying frequencies. If the station to be determined with the goniometer is in a different direction, a control potential appears on the contrary having a definite direction and which will influence the frequency of the generator II until, owing to the retarding line IV which operates a variable phase shift relative to the frequency, the two potentials derived at 6 and at 10—10' are again in quadrature, whereby the frequency will be determined.

The controlling of the generator II can also be realized in different ways known, either mechanically by utilizing the control potential (for instance in order to operate a variable condenser), or by purely electronic means for instance by controlling the negative polarization of a triode or pentode whose output circuit then acts as a variable impedance. In this latter case, it may be advisable to provide the generator II in the form well known of a heterodyne with beats, the frequency being obtained as the result of a beating with low frequency between two heterodynes having high frequency. Finally, the analogy of this part of the circuit with the circuits used for the automatic tuning of receivers should be emphasized. All known circuits aiming at this end could, therefore, likewise be employed instead and in place of the circuit previously described.

The time constants of the system 7—8—9 should be judiciously chosen. The time of the charge, for instance, could be short and the time of the discharge could be relatively long such that if the radiation to be determined by the goniometer is manipulated, the generator II assumes almost immediately the correct frequency and maintains it during the switching pauses, a rapidly acting regulator is thus obtained. It should also be remarked that the control potential derived between 11 and 11' characterizes in this case the frequency proper of the local generator II; this potential conveyed to a measuring apparatus for direct current can thus directly indicate the bearing.

Finally there are cases where it appears to be of small interest to provide in the receiver I a switching at variable frequency, in such cases the operation may be carried out according to the arrangement of Figure 2. The frequency F₁ of the generator II is hereby fixed for instance at 100 cycles per second. Reference numeral V designates then a generator with variable frequency F₂ whose mean frequency is, for instance, 1,000 cycles per second and whose frequency can vary, for instance, by ±50 cycles under the action of the control potential derived from 11—11'. Reference numerals VI and VI' designate two translators or current combining devices to which currents with identical frequency characteristics are applied and the reference numeral IV represents a retarding line as before.

It is seen that, according to the bearing, the potentials applied to the automatic frequency control circuit III in 10—10' and 12—12' have both the same frequency, F₁+F₂, for instance, and that they tend to set themselves in exact quadrature. By the action of the control potential appearing in 11—11', a potential is derived which modifies the frequency F₂. The functioning is thus principally the same as that in reference to Figure 1. The measurement of F₂ gives the bearing and could be obtained simply by reading the control potential in 11—11'.

The present automatic frequency control circuit III is shown equipped with multi-electrode tubes (preferably triodes or pentodes). Aside from the amplification thus obtained, a limitation of the control potential between 11 and 11' is assured which in itself is of importance. Finally, the control potential could also be utilized to provide an entirely astatic regulator such that the frequency of the generator II is maintained, in the absence of the signal, at the value previously attained. The method forming the subject matter of the present invention could moreover be applied in fields other than the goniometer field. It could be utilized especially in all cases where a measurement is to be carried out with alternating currents by means of a local generator by introducing the reading of a phase angle.

I claim as my invention:

1. In a phase measuring device, sources of currents apt to vary in relative phase, one of said currents having a phase dependent upon its frequency, a frequency control circuit, means for applying said currents to said circuit, means for deriving a controlling voltage from said circuit, said controlling voltage dependent upon said relative phase, an oscillator, means connecting said frequency control circuit and said oscillator for applying said voltage to said oscillator to vary its frequency and means effectively connected to said oscillator for indicating said relative phase as a function of said oscillator frequency.

2. In a phase indicating device, sources of currents whose relative phase is to be indicated, a frequency control circuit having an output dependent upon the relative phase of the applied currents, means for applying said currents to said circuit, means for deriving from said circuit a voltage varying as a function of the phase to be indicated, an oscillator, means effectively connecting the output of said control circuit and said oscillator for applying said voltage to said oscillator to vary its frequency and means for indicating said relative phase as a function of said oscillator frequency.

3. In a phase indicator, two sources of currents of unknown relative phase, one of said sources being an oscillator, an automatic frequency control circuit, means for applying currents from one of said two sources to said control circuit, a retardation line connected between the other of said sources and said control circuit for applying the currents from said other source to said control circuit, means for deriving from said control circuit an output potential varying as a function of the relative phase of said applied currents, and means for applying said output potential to said oscillator to vary its frequency.

4. A device of the character of claim 1 in which one of said sources includes said oscillator.

5. A device of the character of claim 3 in which the other source includes a directional radio receiver.

6. A phase indicator including, in combination, two sources of currents of unknown phase, one of said sources including a local generator, a variable frequency generator, a frequency control circuit, a pair of translators, means for applying currents from one of said sources and said variable frequency generator to one of said translators to derive a current of a frequency different from the frequency of either of the applied currents, means for applying currents from said local generator and said variable frequency generator to the other of said translators to derive a second current of said different frequency, means for applying said derived currents to said frequency control circuit, means for deriving a controlling voltage from said circuit, and means for applying said voltage to said variable frequency generator to vary its frequency as a function of the phase of said first named currents.

7. An indicator of the character of claim 6 in which one of said sources includes a directional radio receiver and in which the local generator is connected to said receiver to key the incoming signals.

8. The method of indicating phase as a function of frequency which includes applying currents whose phase is to be indicated to obtain a potential varying as a function of said phase, generating currents of known frequency, varying the frequency of said generated currents as a function of said potential and indicating the resulting frequency.

9. The method of indicating phase which includes deriving currents of phase to be determined, retarding the phase of one of said currents, combining one of said first mentioned currents and said current of retarded phase to obtain a controlling potential, generating a current of controllable frequency, controlling said frequency by applying said potential, and indicating phase as a function of said frequency.

HENRI CHIREIX.